(12) United States Patent
Baker

(10) Patent No.: US 10,562,444 B1
(45) Date of Patent: Feb. 18, 2020

(54) LICENSE PLATE FRAME WITH EMERGENCY LIGHTING

(71) Applicant: Monsour M. Baker, Orlando, FL (US)

(72) Inventor: Monsour M. Baker, Orlando, FL (US)

( * ) Notice: Subject to any disclaimer, the term of this patent is extended or adjusted under 35 U.S.C. 154(b) by 0 days.

(21) Appl. No.: 15/061,207

(22) Filed: Mar. 4, 2016

Related U.S. Application Data

(63) Continuation of application No. 13/917,635, filed on Jun. 13, 2013, now Pat. No. 9,283,889, which is a continuation-in-part of application No. 13/657,641, filed on Oct. 22, 2012, now abandoned.

(60) Provisional application No. 61/583,851, filed on Jan. 6, 2012, provisional application No. 61/550,093, filed on Oct. 21, 2011.

(51) Int. Cl.
*B60Q 1/56* (2006.01)
*B60Q 1/26* (2006.01)

(52) U.S. Cl.
CPC .............. *B60Q 1/56* (2013.01); *B60Q 1/2696* (2013.01)

(58) Field of Classification Search
CPC ........................................................ B60Q 1/56
See application file for complete search history.

(56) References Cited

U.S. PATENT DOCUMENTS

| | | | |
|---|---|---|---|
| 1,798,483 A | 3/1931 | Moore | |
| 1,807,246 A | 5/1931 | Mauro | |
| 4,857,890 A | 8/1989 | Solow | |
| 5,029,053 A | 7/1991 | Solow | |
| 5,408,772 A * | 4/1995 | Pettyjohn | G09F 27/00 40/200 |
| 5,412,887 A | 5/1995 | Layne | |
| 6,027,235 A | 2/2000 | Chen | |
| 6,526,680 B1 * | 3/2003 | Yu | B60R 13/10 362/497 |
| 8,657,463 B2 | 2/2014 | Lichten et al. | |
| 2004/0114391 A1 | 6/2004 | Watkins | |
| 2007/0245607 A1 | 10/2007 | Awai et al. | |
| 2010/0053953 A1 * | 3/2010 | Wung | F21K 9/00 362/235 |
| 2015/0075042 A1 * | 3/2015 | Ebensteiner | B60Q 1/268 40/204 |

* cited by examiner

*Primary Examiner* — Evan P Dzierzynski
(74) *Attorney, Agent, or Firm* — Allen Dyer Doppelt & Gilchrist, PA

(57) ABSTRACT

A license plate frame assembly a housing and a first plurality of lighting elements. The housing is adapted for mounting to a vehicle and has first and second generally opposed pairs of side members defining a central aperture dimensioned for a vehicle license plate to be visible therethrough. Each of the first pair of side members defines a first plurality of lighting element apertures therein. The first plurality of lighting elements is arranged in the housing under the first plurality of lighting element apertures, and mounted in the housing such that light emitted thereby from the first pair of side members is oriented along intersecting first axes at acute angles relative to a plane of the vehicle license plate.

19 Claims, 2 Drawing Sheets

LICENSE PLATE FRAME WITH EMERGENCY LIGHTING

CROSS-REFERENCE TO RELATED APPLICATIONS

This application is a continuation of U.S. patent application Ser. No. 13/917,635, filed on Jun. 13, 2013, which is a continuation-in-part of U.S. Non-provisional patent application Ser. No. 13/657,641, filed on Oct. 22, 2012, which claims the benefit of U.S. Provisional Patent Application Ser. No. 61/583,851, filed on Jan. 6, 2012, and U.S. Provisional Patent Application Ser. No. 61/550,093, filed on Oct. 21, 2011, the contents of which applications are herein incorporated by reference in their entirety.

FIELD OF THE INVENTION

The present invention relates to vehicle emergency lighting, and more particularly, to emergency lighting placed in the vicinity of the vehicle license plate.

BACKGROUND OF THE INVENTION

To enhance the visibility, and hence safety and effectiveness, of many emergency and public service vehicles, emergency lighting is employed on various portions of the vehicle. Some attempts have been made to place emergency lighting in the vicinity of the vehicle license plate—particularly the rear license plate—although further improvements to emergency lighting placement in this key location are possible.

SUMMARY OF THE INVENTION

In view of the foregoing, it is an object of the present invention to provide a license plate frame with emergency lighting. Advantageously, emergency lighting elements are integrated into the license plate frame, which is dimensioned to fit around standard license plate sizes. To increase the field of view of the emergency lighting, the emergency lighting elements along sides of the license plate are arranged at non-perpendicular angles to the plane of the license plate to generate a wider field of view.

The emergency lighting elements can include light emitting diodes (LEDs) and corresponding optics. The frame can be formed of front and back plates, with the optics mounted to the front plate and the LEDs mounted to the back plate in alignment with the optics. Control and power electronics can be located within the plate frame and/or separately located. Advantageously, the frame can be fabricated from aluminum or other heat conductive material to serve as heat sink for higher power LEDs and other heat generating electronic components.

According to an embodiment of the present invention, a license plate frame assembly a housing and a first plurality of lighting elements. The housing is adapted for mounting to a vehicle and has first and second generally opposed pairs of side members defining a central aperture dimensioned for a vehicle license plate to be visible therethrough. Each of the first pair of side members defines a first plurality of lighting element apertures therein. The first plurality of lighting elements is arranged in the housing under the first plurality of lighting element apertures, and mounted in the housing such that light emitted thereby from the first pair of side members is oriented along intersecting first axes at acute angles relative to a plane of the vehicle license plate.

These and other objects, aspects and advantages of the present invention will be better appreciated in view of the drawings and detailed description of a preferred embodiment.

DETAILED DESCRIPTION OF PREFERRED EMBODIMENTS

Figure 1:
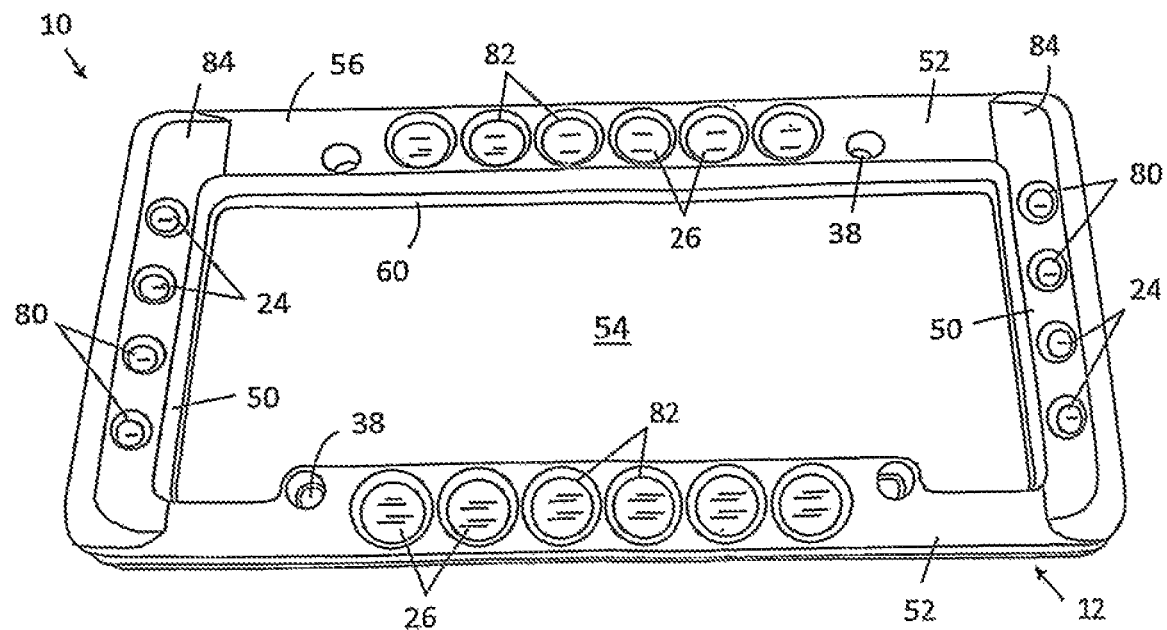
FIG. 1 is a front perspective view of a license plate frame assembly, according to an embodiment of the present invention.
Figure 2:
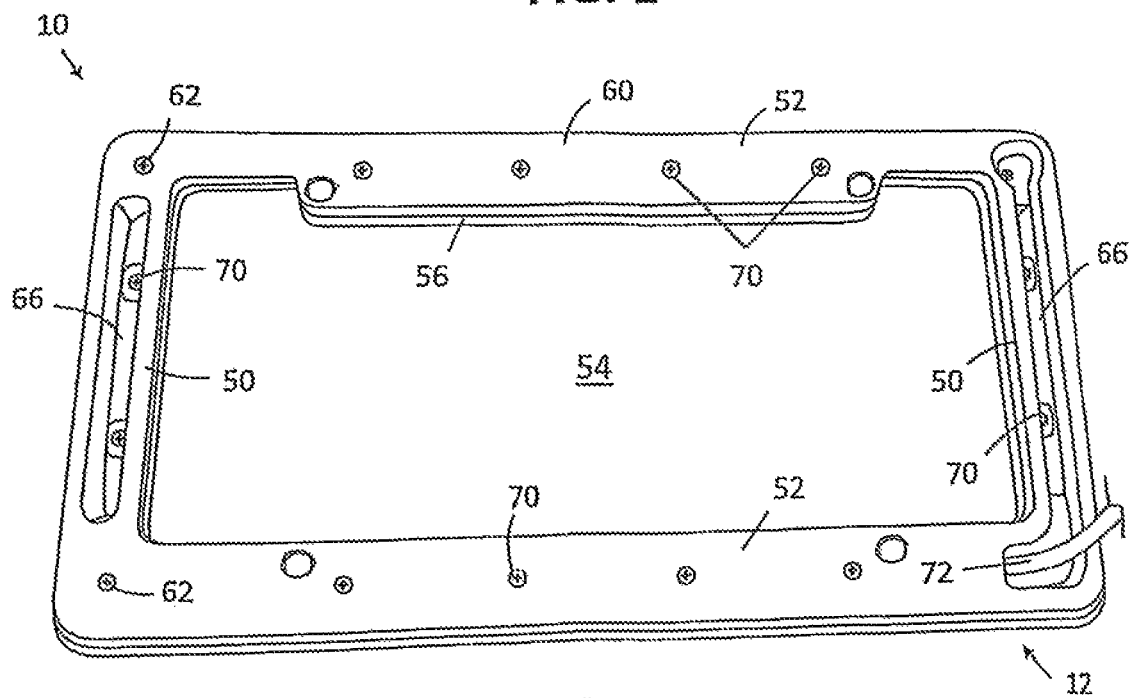
FIG. 2 is a rear perspective view of the license plate frame assembly of FIG. 1.
Figure 3:
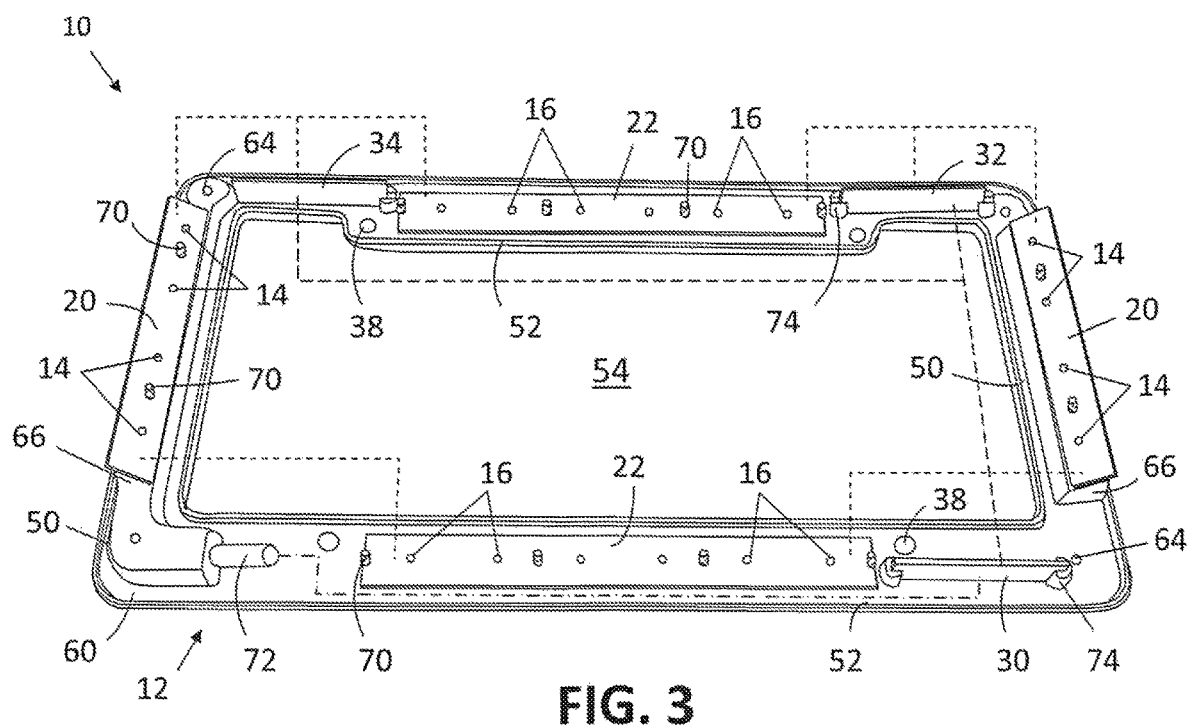
FIG. 3 is a front perspective view of the license plate frame assembly of FIG. 1, with a front housing section removed to show internal details and electrical connections illustrated schematically in broken lines.

According to an embodiment of the present invention, referring to FIGS. 1-3, a license plate frame assembly 10 includes a housing 12 holding first and second pluralities of lighting elements 14, 16, which are respectively mounted on first and second pairs of lighting element circuit boards 20, 22 and respectively covered by first and second pluralities of lenses 24, 26. The lighting elements 14, 16 are preferably light emitting diodes (LED) and are powered via a LED controller board 30 via first and second LED driver boards 32, 34.

Figure 4:
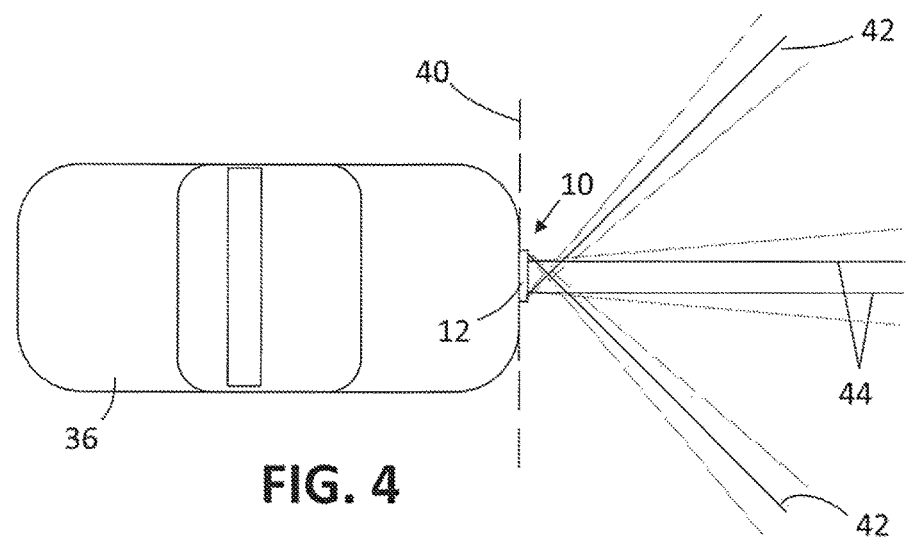
FIG. 4 is top schematic view of a vehicle equipped with the license plate frame assembly of FIG. 1, showing approximate orientations of emitted light relative a license plate plane.

Also referring to FIG. 4, the housing 12 is adapted for mounting to a vehicle 36, for instance via mounting holes 38. For referential purposes, when the license plate frame assembly is mounted to the vehicle, a license plate plane is represented in one dimension by the line 40, with its second dimension extending into and out of the page. The first plurality of lighting elements 14 are mounted in the housing 12 such that light emitted thereby is oriented along intersecting first axes 42 at acute angles relative to the license plate plane, most preferably approximately forty-five (45) degree angles. The second plurality of lighting elements are mounted in the housing 12 such that light emitted thereby is oriented along second axes 44 approximately perpendicular to the license plate plane.

Referring again to FIGS. 1-3, the housing 12 has first and second generally opposed pairs of side members 50, 52 that define a central aperture 54. The central aperture is dimensioned for a vehicle license plate to be visible therethrough. The housing 12 is preferably made of aluminum front and back sections with an automotive-grade powder coated black finish for durability and stealth installation. Preferred dimensions of 12.375"×6.375"×1.3/16" allow a universal fit for all 12"×6" North and South American License Plates.

Advantageously, the housing 12 is made from connected front and back housing sections 56, 60, such that the first and second pairs of side members 50, 52 each have respective front and back portions. The sections 56, 60 are connected by a plurality of housing fasteners 62 threaded through holes 64. Preferably, the junction between sections 56, 60, as well as all holes or other openings thereinto, are suitably sealed so as to resist the introduction of moisture and/or dirt into the housing 12.

The back portions of the first pair of side members 50 are formed with angled mounting surfaces 66, on which the first LED circuit boards 20 are directly mounted so as to orient the LEDs 14 at the desired angle. The second LED circuit boards 22 are mounted directly mounted to the back portions of the second pair of side members 52. Thus, the aluminum structure of the housing 12, and more particularly the back housing section 60, can serve as a heat sink for the LEDs 14, 16. Proper alignment of the LEDs 14, 16 is facilitated by mounting the circuit boards 20, 22 using fasteners 70 threaded through pre-formed aligned openings in the back housing section 60 and the boards 20, 22.

Power and command inputs are introduced into the housing 12 via a cable 72, routed through a sealed opening thereinto. The cable 72 connects to the LED controller board 30, which selectively supplies power the LED driver boards 32, which in turn supply power to the LED boards 20, 22. The emergency lighting elements can advantageously be controlled to give multiple flash patterns. The connections between the circuit boards are depicted schematically, and it should be appreciated that all wiring and connections are made internally to the housing 12. Preferably, the controller and driver boards 30, 32 are mounted between the front and back housing sections 56, 60, and proper placement is facilitated by notched posts 74.

The lenses 24, 26 are arranged in respective first and second pluralities of lighting element apertures 80, 82, defined in the first and second pairs of side elements 50, 52. The lenses 24, 26 can be used to better focus or distribute visible output of the LEDs 14, 16 in or about a desired orientation, although "lens" as used herein can encompass a blank lens that simply lets light pass with little or no convergence or divergence. The first plurality of lenses 24 and the first plurality of apertures 80 are preferably located in inclined surfaces 84 of the front housing section 56, which inclined surfaces 84 overlie the angled mounting surfaces 66 of the back housing section 60.

It will be appreciated that the foregoing license plate frame assembly 10 offers a compact and reliable means for greatly increasing visibility from the rear (and/or front) of an emergency vehicle, while being relatively easy to install and minimally impacting the unlighted appearance of the vehicle. Additionally, features of the frame assembly 10 allow for quick and reliable manufacture, as well as significant durability when in use.

The above embodiment is provided for exemplary and illustrative purposes. Those skilled in the art will appreciate that the present invention is not necessarily limited to such an embodiment. Rather, numerous modifications, and adaptations for particular circumstances, fall within the scope of the invention as herein shown and described and of the claims appended hereto.

What is claimed is:

1. A vehicle license plate frame assembly comprising:
    a housing having first, second and third side portions at least partially defining a license plate opening therebetween extending across a license plate plane, the first and second side portions extending along opposite sides of the license plate opening with the third side portion extending therebetween, the housing having an inner face and an outer face facing away from opposite sides of the license plate plane; and
    a plurality of lighting elements mounted to the housing, the plurality of lighting elements including at least first, second and third groups of lighting elements mounted on the first, second and third side portions, respectively;
    wherein each of the first, second and the third groups of lighting elements includes one or more lights and one or more lenses to distribute visible output of the respective one or more lights from the outer face; and
    wherein the lighting elements of the first and second group of lighting elements are oriented along respective first and second axes relative to the license plate plane, the first and second axes being angled acutely relative to the license plate plane so as to intersect at a point beyond the outer face.

2. The vehicle license plate frame assembly of claim 1, wherein the first, second and third groups of lighting elements are concentrated on the housing, such that spacings between the first, second and third groups of lighting elements are greater than spacings between the lighting elements within the first, second and third groups of lighting elements.

3. The vehicle license plate frame assembly of claim 1, wherein the housing further has a fourth side portion extending between the first and second side portions opposite the third side portion across the license plate opening.

4. The vehicle license plate frame assembly of claim 3, wherein the plurality of lighting elements further include a fourth group of lighting elements mounted on the fourth side portion.

5. The vehicle license plate frame assembly of claim 1, wherein the third side portion includes first and second reduced height sections adjacent to the first and second side portions, respectively, and an increased height section between the first and second reduced height sections, such that an edge of the license plate opening formed by the third side portion is not straight.

6. The vehicle license plate frame assembly of claim 5, wherein the third group of lighting elements is mounted exclusively on the increased height section.

7. The vehicle license plate frame assembly of claim 1, wherein a pair of license plate mounting holes are defined extending through the third side portion.

8. The vehicle license plate frame assembly of claim 7, wherein the third group of lighting elements are arranged between the pair of license plate mounting holes.

9. The vehicle license plate frame assembly of claim 1, wherein the first and second side portions have respective first and second mounting surfaces formed therein, the first and second groups of lighting elements being mounted to the first and second mounting surfaces, respectively.

10. A vehicle license plate frame assembly comprising:
    a housing having opposite first and second side portions, and opposite third and fourth side portions extending between the opposite first and second side portions such that a license plate opening is defined therebetween extending across a license plate plane, the housing having an inner face and an outer face facing away from opposite sides of the license plate plane; and
    a plurality of lighting elements mounted to the housing on around the license plate opening, the plurality of lighting elements including at least first, second and third groups of lighting elements mounted on the first, second and third side portions, respectively;
    wherein each of the first, second and the third groups of lighting elements includes one or more lights and one or more lenses to distribute visible output of the respective one or more lights from the outer face; and
    wherein the lighting elements of the first and second group of lighting elements are oriented along respective first and second axes relative to the license plate plane, the first and second axes being angled acutely relative to the license plate plane so as to intersect at a point beyond the outer face.

11. The vehicle license plate frame assembly of claim 10, wherein plurality of lighting elements further includes a fourth group of lighting elements mounted on the fourth side portion.

12. The vehicle license plate frame assembly of claim 11, wherein the plurality of lighting elements are only located in the first, second, third and fourth groups of lighting elements, and empty areas of the housing are located therebetween containing no lighting elements.

13. The vehicle license plate frame assembly of claim 12, wherein the empty areas are wider than internal spacings between the light elements within the first, second, third and fourth groups of lighting elements.

14. The vehicle license plate frame assembly of claim 11, wherein the first, second, third, and fourth groups of lighting elements are mounted to the housing on first, second, third and fourth common substrates, respectively.

15. The vehicle license plate frame assembly of claim 14, wherein the first and second side portions have respective first and second mounting surfaces formed therein, the first and second common substrates being mounted to the first and second mounting surfaces, respectively.

16. The vehicle license plate frame assembly of claim 15, wherein the third side portion includes first and second reduced height sections adjacent to the first and second side portions, respectively, and an increased height section between the first and second reduced height sections, such that an edge of the license plate opening formed by the third side portion is not straight.

17. The vehicle license plate frame assembly of claim 16, wherein the third common substrate is mounted on the increased height section.

18. The vehicle license plate frame assembly of claim 17, wherein a pair of license plate mounting holes are defined extending through the increased height section.

19. The vehicle license plate frame assembly of claim 16, wherein the third group of common substrate is mounted between the pair of license plate mounting holes.

* * * * *